Figure 1:
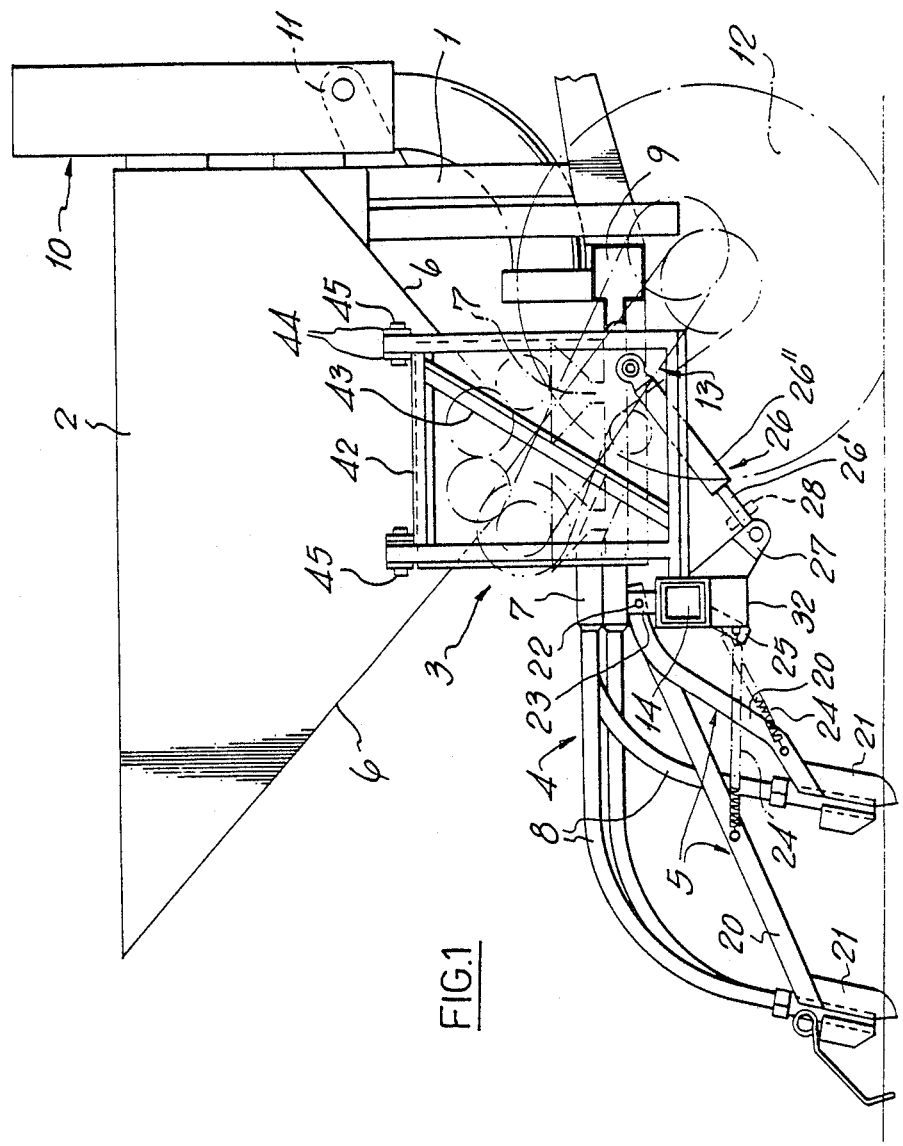

United States Patent [19]

Dean et al.

[11] Patent Number: 4,811,795
[45] Date of Patent: Mar. 14, 1989

[54] SEED DRILL

[75] Inventors: Malcolm Dean, Allesley; Kenneth I. Withers, Baginton, both of England

[73] Assignee: Massey-Ferguson Services N.V., Curacao, Netherlands Antilles

[21] Appl. No.: 114,948

[22] Filed: Oct. 30, 1987

[30] Foreign Application Priority Data

Oct. 30, 1986 [GB] United Kingdom ............... 8625976

[51] Int. Cl.$^4$ ............................................. A01B 63/00
[52] U.S. Cl. ...................................... 172/456; 111/52
[58] Field of Search ............... 172/311, 456, 466, 662, 172/776, 810; 111/1, 52, 54, 56, 57

[56] References Cited

U.S. PATENT DOCUMENTS

| 3,669,195 | 6/1972 | Green et al. ............... 172/456 X |
| 3,804,036 | 4/1974 | Seifert, Jr. .................. 111/1 |
| 4,147,217 | 4/1979 | Hawkins, Jr. ............... 172/456 X |
| 4,715,302 | 12/1987 | Briggs ......................... 111/1 |

FOREIGN PATENT DOCUMENTS 1370757 of 1964 France ............................ 172/456

Primary Examiner—Brian S. Steinberger

[57] ABSTRACT

A seed drill comprising a frame (1), a beam (14) that is mounted on the frame (1) so as to extend transversely of the direction of forward motion of the drill and that has a plurality of coulters (5) mounted along the beam (14) so as to trail therefrom and engage the ground when in work, the beam (14) comprising a central beam portion (29) and an outer beam portion (30) each side that is pivotally connected to the central beam portion (29) so as to be pivotable upwards to a transport position, characterized in that a strut assembly (39) is provided at each side of the drill between the frame (1) and the respective outer end of the beam (14) so as to be inclined downwards towards said outer end when the outer beam portion (30) is lowered, and pivotal connections (45, 47) being provided between the ends of the strut assembly (39) and the frame (17) and the outer beam portion (30) so that the strut assembly (39) can pivot upwards with the outer beam portion (30) to the transport position, the pivotal connection (4) between the strut assembly (39) and the outer beam portion (30) comprising an elongated member (46) that is pivotally connected to the strut assembly (39) and is slidably received within the outer end of the beam (14) so as to telescope therewith as the outer beam portion (30) and the strut assembly (39) is raised and lowered, and releasable retaining means (53) that serves to hold the elongated member (46) against withdrawal from the outer beam portion (30) when both are lowered.

7 Claims, 5 Drawing Sheets

SEED DRILL

This invention relates to a seed drill having a beam that carries the coulters and is formed with outer portions mounted so that they can be moved inwards to reduce the width of the drill for transportation.

Pneumatic drills generally have a central seed hopper that is located behind the tractor and which supplies seeds pneumatically through pipes to coulters carried on a transverse beam that extends across the width of the drill. In order to drill a wide bout, a large beam may be provided that projects both sides of the tractor, and for ease of transportation this beam may be formed with outer portions that can be moved inwards of the tractor to reduce the overall width of the drill.

Pneumatic drills are known in which the coulter beam has outer portions that are pivotally connected to the ends of a central beam portion so that they can be folded upwards to the transport position. A separate hydraulic actuator folds each outer portion of the beam, and retaining means is provided to hold each outer portion in the lowered working position. However, with longer outer portions, the forces acting on these outer portions increase and produce problems with flexing of the beam or excess strain on the retaining means. An object of the present invention is to reduce or overcome these problems According to the invention a seed drill comprises a frame, a beam that is mounted on the frame so as to extend transversly of the direction of forward motion of the drill and that has a plurality of coulters mounted along the beam so as to trail therefrom and engage the ground when in work, the beam comprising a central beam portion and an outer beam portion each side that is pivotally connected to the central beam portion so as to be pivotable upwards to a transport position, and a strut assembly being provided at each side of the drill between the frame and the respective outer end of the beam so as to be inclined downwards towards said outer end when the outer beam portion is lowered, and pivotal connections being provided between the ends of the strut assembly and the frame and the outer beam portion so that the strut assembly can pivot upwards with the outer beam portion to the transport position, the pivotal connection between the strut assembly and the outer beam portion comprising an elongated member that is pivotally connected to the strut assembly and is slidably received within the outer end of the beam so as to telescope therewith as the outer beam portion and strut assembly is raised and lowered, and releasable retaining means that serves to hold the elongated member against withdrawal from the outer beam portion when both are lowered.

The provision of the strut assembly each side of the drill serves to brace the outer ends of the beam against flexing vertically, and preferably also horizontally. Preferably, the strut assembly comprises a framework that is pivotally connected to the frame at two points spaced apart in the direction of forward motion of the drill in work, thereby bracing the outer ends of each beam against flexing horizontally.

The retaining means preferably comprises a flange on the elongated member that abuts the outer end of the beam and is received between a pair of lugs on the outer end of the beam having holes to receive a retaining pin that enegages behind said flange.

In an embodiment of the invention in which the beam is rotatable about its longitudinal axis by an actuator so as to load the coulters into work, the outer beam portion is adapted to be rotatable on said elongated member.

Figure 2:
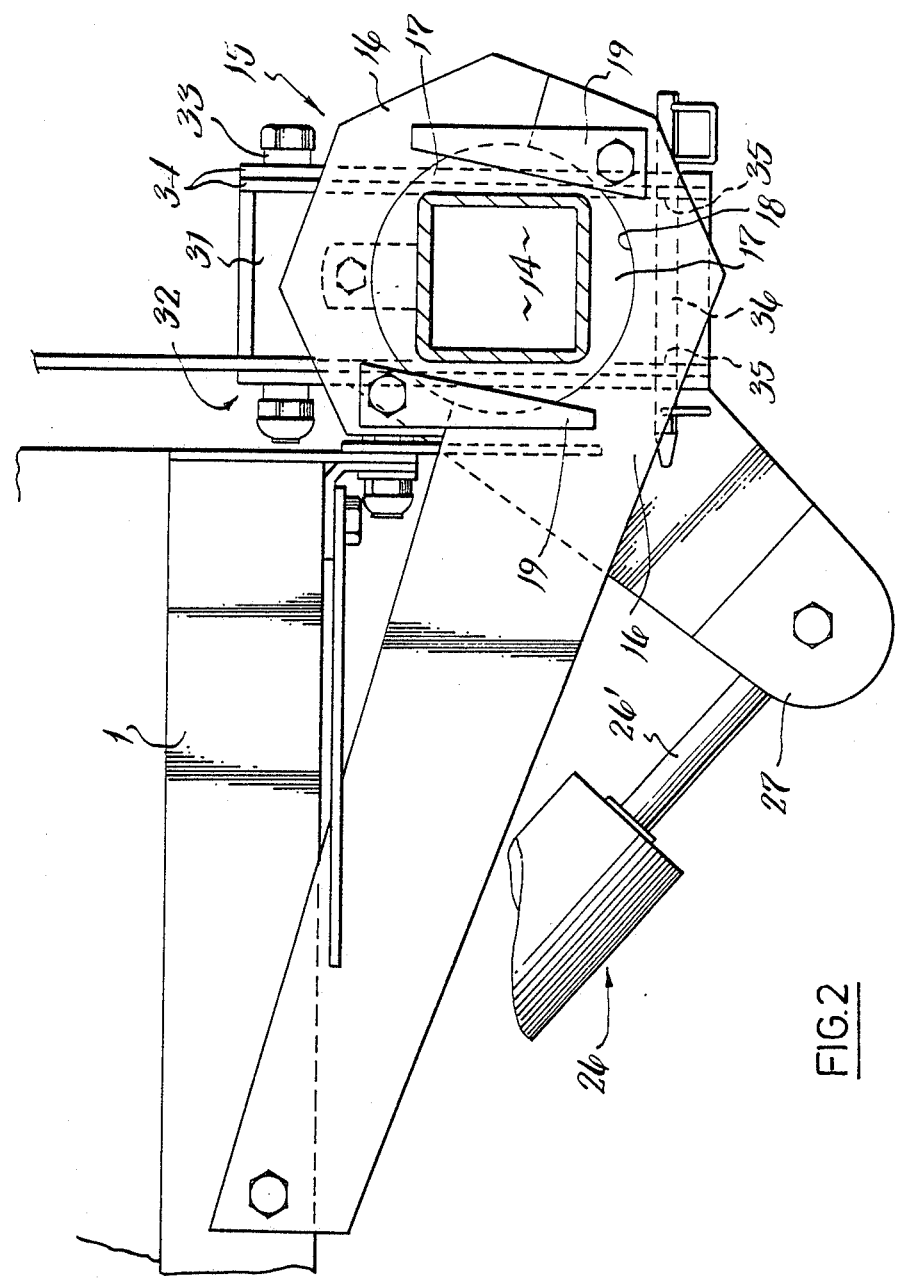
Figure 3:
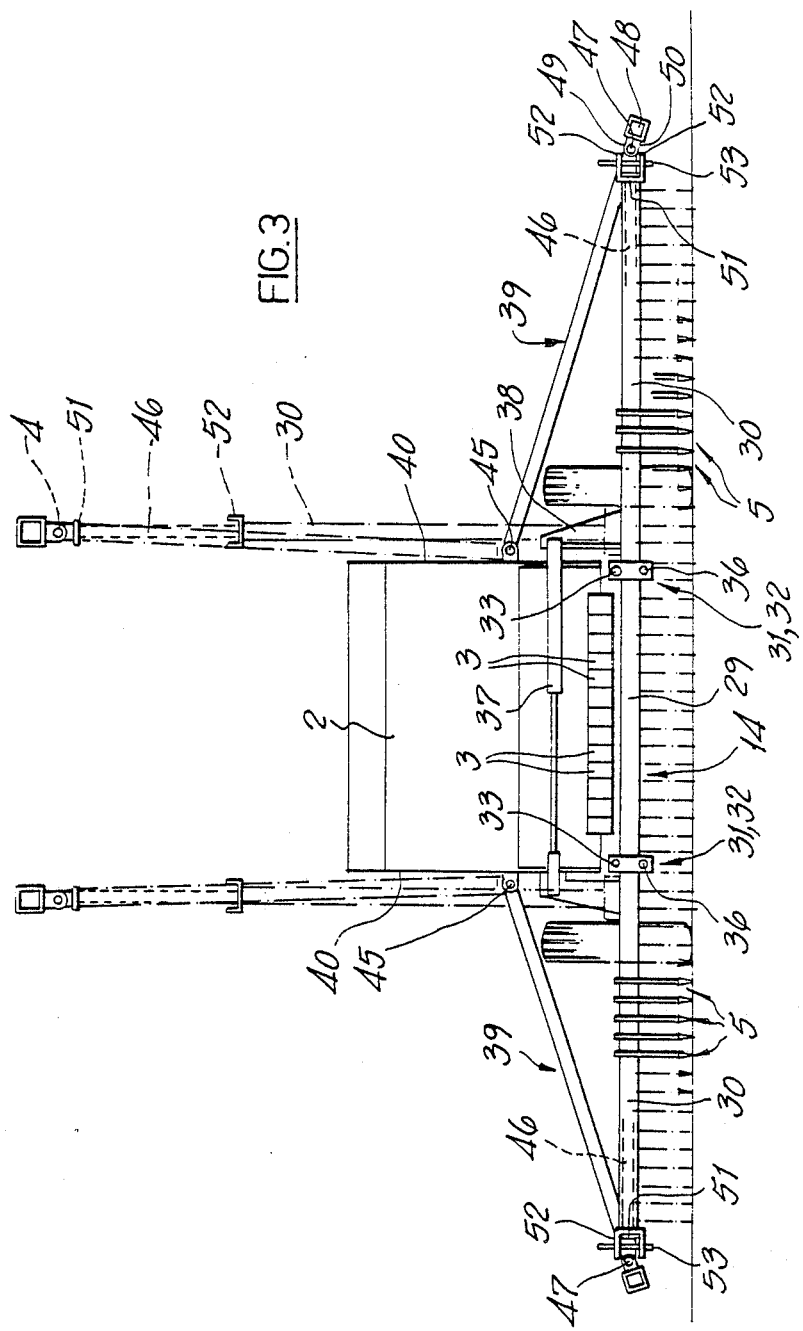
Figure 4:
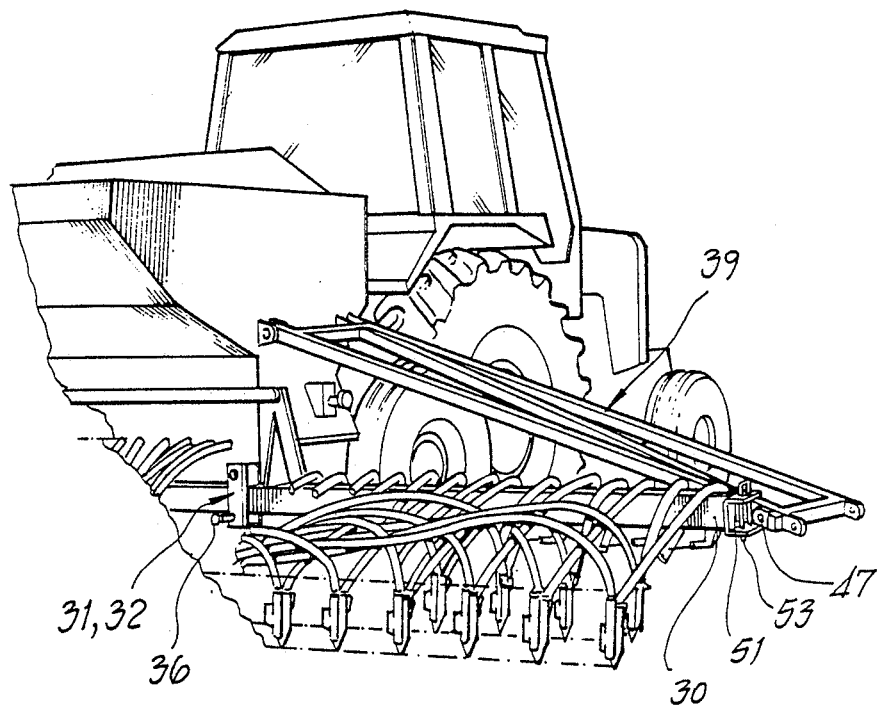
Figure 5:
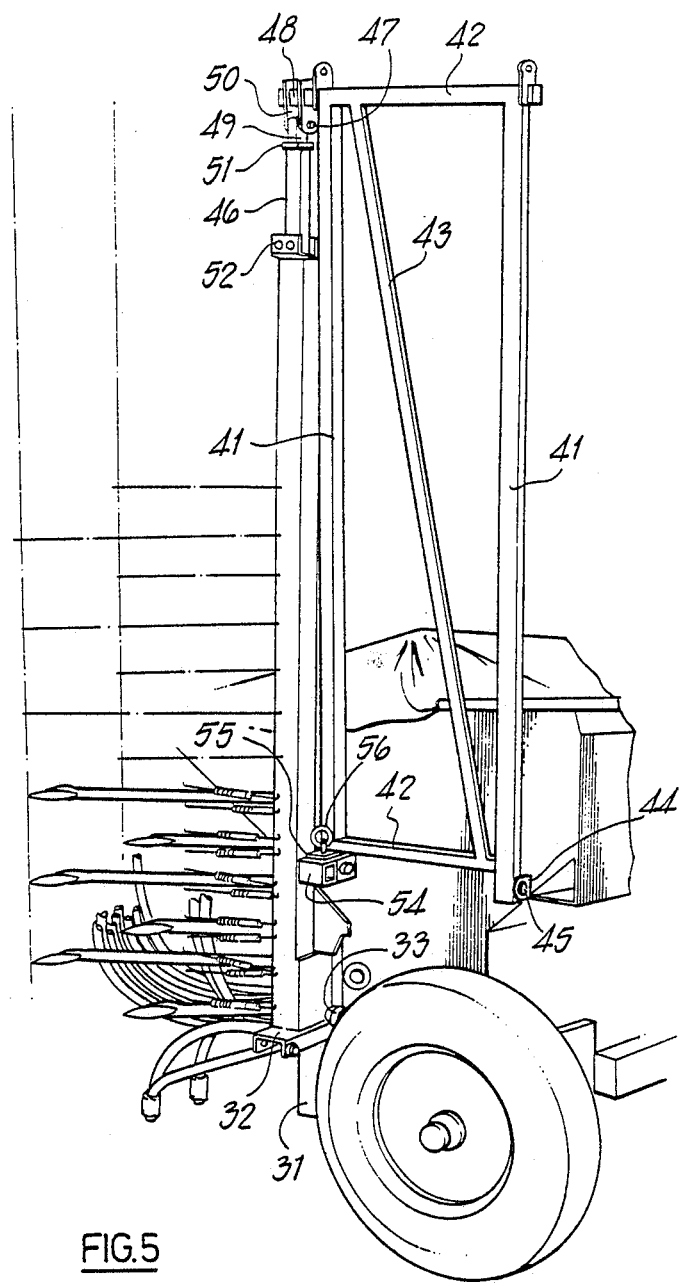

The invention will now be described by way of example with reference to the accompanying drawings in which;

FIG. 1 is a general schematic side view of a pneumatic seed drill according to the invention with the coulter beam in its work position, FIG. 2 is a detailed side view of the support and angular adjustment means for the coulter beam of the drill in FIG. 1, FIG. 3 is a general rear view of the drill of FIG. 1, FIG. 4 is a perspective rear view of one side of the drill of FIG. 1 showing the beam in its work position, and FIG. 5 is a perspective side view of one side of the drill of FIG. 1 showing the beam in its folded transport position.

The illustrated drill comprises a frame 1 carrying a seed hopper 2. A plurality of seed metering mechanisms 3 dispense seed from the hopper into pneumatic distribution means 4 that conveys the seed in a flow of air to each of a plurality of coulters 5 pivotally mounted on the frame. The seed metering mechanisms 3 are mounted in two rows across the width of the hopper, one beneath each inclined bottom wall 6 of the hopper, and each delivers seed into the pneumatic distribution means comprising a venturi unit 7 and a length of tube 8 connecting the unit 7 to an associated coulter 5. The venturi units 7 are connected to a common air manifold 9 that is pressurised by an air pump 10.

Tractor mounting points 11 are provided on the front of the frame 1 for connection of the drill to the rear lifting links of a tractor.

A pair of landwheels 12 are mounted on the frame so as to support the drill when it is lowered onto the ground for work, and a transmission system 13 between the landwheels and the metering mechanisms serves to drive the latter and dispense seed.

A rotatable control beam 14 is mounted in a pair of bearings 15 (FIG. 2) so that it extends laterally across the width of the drill. Each bearing 15 is a plane bearing comprising a two-part outer support 16 connected to the frame 1 and an inner ring 17 that is connected coaxially to the control beam 14 and is rotatably received in a circular cut-out 18 in the outer support 16. A pair of bolted flanges 19 hold the two parts of the outer support 16 together and overlap the edges of the inner ring 17 to hold it captive.

Each coulter comprises an arm 20 that carries a furrow opening tool 21 at its rear end and which is pivotally connected to the control beam 14 at its leading end via a pivot pin 22 engaging a bracket 23 projecting upwards from the top of the control beam. A pair of tension springs 24 are connected between the arm 20 of each coulter and a bracket 25 that projects downwards from the underside of the control beam, thereby to act in pulling the coulter downwards.

A hydraulic ram 26 is connected between the frame 1 and a lever arm 27 on the control beam 14 (FIG. 1), and is operable to rotate the beam, thereby to lower or raise the coulters. The sowing depth of the coulters is determined by the stroke of the ram, and the stroke is varied by the use of spacers 28 that can be mounted on the rod 26' of the ram between the cylinder 26'' of the ram and the lever arm 27.

The control beam 14 is formed as a folding beam comprising a central portion 29 lying within the width of the hopper, the frame and the landwheels, and an outer portion 30 pivotally connected to each end of the central portion so as to be pivotable upwards to a transport position. The pivotal connection is formed by an upright (see FIG. 2) hinge comprising a pair of nesting channel-section members 31,32 that are connected to the ends of said beam portions so that they nest together when the outer beam portion is lowered and pivot apart about an upper horizontal hinge pin 33 when the outer portion is raised. The side walls 34 of the channel-section members 31,32 support the hinge pin 33 and are formed with holes 35 below the hinge pin to receive a removable retaining pin 36 to hold the hinge closed with the outer portion lowered.

A hydraulic ram 37 is connected between posts 38 at the inner end of each outer portion 30 and is operated to raise both outer portions 30 simultaneously.

The central and outer portions 29,30 of the beam 14 are formed from square-section tube for strength and lightness. The outer portions 30 can be as long as the central portion 29 and in order to resist flexing they are braced at their outer ends by a strut assembly 39 each side that is pivotally connected to the adjacent side wall 40 of the hopper 2 and folds upwards with the respective outer portion 29.

Each strut assembly 39 comprises a rectangular framework of two parallel side members 41 that project laterally from the hopper 2, a cross member 42 between the side members at their inner ends and outer ends, and a diagonal member 43 connected between the cross members 42 so as to extend diagonally across the framework. This construction is rigid, and the use of square section tube for all members makes it lightweight. The inner end of each side member 42 is received between a pair of lugs 44 on the side wall 40 of the hopper and is pivotally connected therebetween by a horizontal bolt 45 so that both bolts 45 form a horizontal pivot axis for the whole strut assembly about which it can pivot between an upright transport position and an outwardly and downwardly inclined work position.

The strut framework is located in front of the adjacent outer portion 30 of the beam, with the rearmost side member 41 and outer portion 30 spaced closely adjacent one another, and these two members are pivotally connected at their outer ends by a connection comprising an elongated round section member 46 that is a telescopic slide fit within the outer end of the outer portion 30 and is pivotally connected by a bolt 47 at its outer end to a rearward extension 48 of the outer cross member 42 (FIGS. 3 and 4). A lug 49 on the end of the elongated member 46 is received between a pair of inwardly directed lugs 50 on the extension 48, and the bolt 47 engages aligned holes in the lugs to form a horizontal fore and aft pivot axis.

A flange 51 on the end of the elongated member 46 carries the lug 49 and projects radially of the elongated member so as to abut the end of the outer portion 30 when the latter is in the lowered work position. A pair of flanges 52 project from the end of the outer portion 30, top and bottom, and receive the flange 51 therebetween, and a U-shaped removable retaining pin 53 engages aligned pairs of holes in said pair of flanges 52 so as to engage behind the flange 51 on the elongated member 46 and retain the latter in its fully inserted position within the outer portion 30 of the beam. The outer portion 30 is then locked in its lowered work position and is braced against both horizontal and vertical flexing by the strut assembly 39. The retaining pin 53 is removed to release the elongated member 46, and the retaining pin 36 is removed to release the inner hinge 31,32,33, so that both outer portions 30 of the beam can be folded up to the transport position. The elongated members 46 are then extended from the outer portions and serve to further guide and support the outer portions (FIG. 5).

Once in the transport position, each outer portion 30 can be locked in position by means comprising a forward extension 54 on the front face of the outer portion that engages between a pair of outwardly projecting lugs 55 on the inner end of the rearmost member 41, and a retaining pin 56 that is inserted between aligned holes in the extension 54 and lugs 55.

We claim:

1. A seed drill comprising a frame, a beam that is mounted on the frame so as to extend transversely of the direction of forward motion of the drill from one side to the other and that has a plurality of coulters mounted along the beam so as to trail therefrom and engage the ground when in work, the beam comprising a central beam portion and an outer beam portion on each side having an outer end and an inner end with a pivotal connection to the central beam portion so that the outer beam portion is pivotable upwards from a work position to a transport position, a strut assembly at each side of the drill having at an inner end an inner pivotal connection to the frame and having at an outer end an outer pivotal connection to the outer end of the outer beam portion so as to be inclined downwards towards said outer end when the outer beam portion is in the work position and so that the strut assembly pivots upwards with the outer beam portion to the transport position, said outer pivotal connection between the strut assembly and the outer beam portion comprising an elongated member that is pivotally connected to the outer end of the strut assembly and is slidably received within the outer end of the outer beam portion so as to telescope therewith as the outer beam portion and strut assembly are raised and lowered, and releasable retaining means that serves to hold the elongated member against withdrawal from the outer beam portion when both are lowered.

2. A seed drill as claimed in claim 1 in which the beam is mounted on said frame so as to be rotatable about the longitudinal axis of the beam so as to load the coulters into work, the outer beam portion being rotatable on said elongated member.

3. A seed drill as claimed in claim 2 in which the retaining means comprises a flange on the elongated member that abuts the outer end of the outer beam portion and is received between a pair of lugs on the outer end of the outer beam portion having holes to receive a retaining pin that engages behind said flange.

4. A seed drill as claimed in claim 1 in which the pivotal connection between the central beam portion and the outer beam portion includes releasable retaining means that serves to hold the outer beam portion in the work position.

5. A seed drill as claimed in claim 1 in which the strut assembly comprises a framework that is pivotally connected to the frame at two points spaced apart in the direction of forward motion of the drill in work.

6. A seed drill as claimed in claim 1 in which the strut assembly is located forwards of the beam.

7. A seed drill as claimed in claim 1 in which a hopper is mounted on the frame and the strut assemblies are connected to the sides of the hopper.

* * * * *